(12) United States Patent
Bart et al.

(10) Patent No.: US 7,596,938 B2
(45) Date of Patent: Oct. 6, 2009

(54) TURBOMACHINE WITH A DEFLECTOR SYSTEM

(75) Inventors: Jacques Rene Bart, Soisy sur Seine (FR); Laurent Behaghel, Montgeron (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/050,456

(22) Filed: Mar. 18, 2008

(65) Prior Publication Data

US 2008/0236133 A1 Oct. 2, 2008

(30) Foreign Application Priority Data

Mar. 30, 2007 (FR) .................................. 07 54153

(51) Int. Cl.
*F02C 3/00* (2006.01)
(52) U.S. Cl. .................. 60/39.092; 60/39.091; 55/306; 415/212.1
(58) Field of Classification Search .............. 60/39.092, 60/39.091, 785, 244, 226.1; 55/306; 415/121.1, 415/121.2
See application file for complete search history.

(56) References Cited

U.S. PATENT DOCUMENTS

| | | | | |
|---|---|---|---|---|
| 5,061,914 A | * | 10/1991 | Busch et al. ................. | 337/140 |
| 5,123,240 A | * | 6/1992 | Frost et al. ..................... | 60/779 |
| 5,279,109 A | | 1/1994 | Liu et al. | |
| 6,702,873 B2 | * | 3/2004 | Hartman .......................... | 95/8 |
| 7,296,395 B1 | * | 11/2007 | Hartman et al. .......... | 60/39.092 |
| 2003/0196548 A1 | | 10/2003 | Hartman | |

FOREIGN PATENT DOCUMENTS

FR 2 664 018 1/1992

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A turbomachine front portion includes an internal support shroud for the fan outlet guide vanes, and a flow splitter fairing from which a primary duct and a secondary duct originate. The front portion includes at least one deflector system configured to prevent/limit the ingress of hailstones inside the primary duct, the system including at least one deflecting surface together with an actuator for moving the surface from a retracted position to a deployed position for deflecting the hailstones, the system being mounted on the shroud such that, in the deployed position, a downstream end of the surface is situated upstream of the splitter fairing.

18 Claims, 4 Drawing Sheets

TURBOMACHINE WITH A DEFLECTOR SYSTEM

BACKGROUND OF THE INVENTION

The present invention generally relates to a turbomachine front portion whose design makes it possible to prevent/limit the ingress of foreign bodies, such as hailstones, inside an annular primary duct of the turbomachine.

The invention applies to any type of turbomachine, preferably for an aircraft, and preferably applies to turbomachines in which a low-pressure compressor is not provided at the inlet of the annular primary duct, this type of turbomachine being generally referred to as "small-size" on account of the small fan diameter associated with it.

DESCRIPTION OF THE PRIOR ART

In existing turbomachines equipped with a low-pressure compressor at the inlet of the primary annular duct, also referred to as a "booster", there is generally provided a servo-control system between this same booster and the high-pressure compressor situated further downstream in the primary duct, this control system being able to be operated so as to cause doors to open from the outer surface of the primary duct. During the phases of these doors being opened into the primary duct, some of the air from the primary flow is then deliberately diverted by the doors to join the cooler air of the secondary flow, which for its part circulates in an annular secondary duct situated radially outwardly with respect to the primary duct.

This servo-control system, also known by the name of variable bleed valve (VBV), has as its main function to unload the booster outlet so as to prevent the booster from surging under certain conditions.

Moreover, the deployed doors of the servo-control system at the same time make it possible to scoop foreign bodies such as hailstones which, as they come into contact with these doors projecting into the primary duct, are redirected toward the secondary annular duct, in which they are no longer at risk of causing a combustion chamber flameout. This phenomenon occurs in a similar manner when the technology employed consists in deploying the doors radially outwardly with respect to the annular primary duct, owing to the suction effect observed.

Now, in turbomachines of smaller size, such as that shown in FIG. 1, the inlet of the annular primary duct 16 is generally devoid of a booster, which means that there is no longer any need to make provision for the installation of a servo-control system of the above-described type, in the sense that the risks of booster surge quite clearly no longer exist. In any event, the installation of such a servo-control system in a small-size turbomachine often proves impossible owing to the small amount of available space between the two annular ducts, in which space the servo-control system on the larger-size turbomachines is conventionally housed.

Thus, in this case where the primary duct is no longer equipped with the servo-control system of the VBV type, the hailstone deflection function can no longer be ensured.

To tackle this problem, it has been proposed in the prior art to set back as far as possible the splitter fairing 20 which separates the primary flow F1 and secondary flow F2, so that the inlet of the annular primary duct 16 is substantially "masked" by the outer surface of the internal support shroud 10 for the fan outlet guide vanes 12, as shown by the broken imaginary line 11 in FIG. 1.

Nevertheless, setting the splitter fairing too far back can result in poor air supply to the annular primary duct, owing to its masked position mentioned above.

Generally, it often remains extremely difficult to find a compromise between setting the splitter fairing sufficiently back to limit the introduction of hailstones and other foreign bodies into the annular primary duct and moving it sufficiently forward to ensure a satisfactory air supply to the annular primary duct.

Thus, there is a need for a turbomachine front portion of simple and astute design that makes it possible to prevent/limit the ingress of foreign bodies, such as hailstones, inside an annular primary duct, in particular with regard to installing it in a small-size turbomachine devoid of a booster.

SUMMARY OF THE INVENTION

To this end, the subject of the invention is a turbomachine front portion comprising an internal support shroud for the fan outlet guide vanes, and a flow splitter fairing from which an annular primary duct and an annular secondary duct of the turbomachine originate. According to the invention, said front portion additionally comprises at least one deflector system intended to prevent/limit the ingress of foreign bodies such as hailstones inside said primary duct of the turbomachine, said deflector system comprising at least one deflecting surface together with an actuator for moving said deflecting surface from a retracted position to a deployed position for deflecting the foreign bodies, and/or vice versa, said deflector system being mounted on said internal support shroud for the fan outlet guide vanes such that, in the deployed position, a downstream end of said deflecting surface is situated upstream of said flow splitter fairing.

Thus, one of the particular features of the present invention lies in the provision, at the inlet of the annular primary duct, of one or more deflector systems for deflecting foreign bodies, such as hailstones, these systems preferably being chosen to be of simple, inexpensive and compact design. With this technical solution, the foreign bodies can advantageously be diverted from their path by the deflecting surface, upstream of the annular primary duct. In other words, they are thus deflected by the deflecting surface prior to reaching the inlet of the annular primary duct, such that the risks of them entering inside of the latter duct, after they have struck the deflecting surface, are reduced virtually to zero.

The deflector system can easily be installed in any type of turbomachine, and in particular in so-called small-size turbomachines devoid of a booster or low-pressure compressor. The invention can thus preferably serve for scooping hailstones in the manner of the VBV-type servo-control particularly of the prior art, such that the presence of these systems is no longer required to ensure the aforementioned scooping function. Therefore, the invention provides an effective and astute solution particularly for turbomachines devoid of a booster, and hence also devoid of a VBV-type servo-control system.

The deflector system provided in the present invention, which is installed on the internal support shroud for the fan outlet guide vanes in order to prevent/limit the ingress of hailstones inside the annular primary duct, also makes it possible to limit the degree of setback, or even exclude any setback, of the splitter fairing which separates the primary and secondary flows, as was encountered previously, since the hailstones are now scooped at least in part using the system according to the invention, and no longer just by setting back the splitter fairing to mask the inlet of the primary duct. Therefore, the problem of the prior art concerning the unsatisfactory air supply to the annular duct, caused by the splitter fairing being set too far back, can be eliminated by virtue of the present invention.

Preferably, said deflector system is mounted on said internal support shroud for the fan outlet guide vanes, downstream of said fan outlet guide vanes, but still upstream of the flow splitter fairing. In other words, the deflector system is preferably situated near the inlet of the annular primary duct, upstream of this inlet, this location being favored since it corresponds to that offering the greater efficiency to the deflector system.

Preferably too, in any longitudinal section passing through said deflector system, an imaginary straight line corresponding to a tangential direction of said downstream end of said deflecting surface, in the deployed position, passes upstream of an upstream end of said splitter fairing.

This particular feature has been adopted with preference subsequent to the observation whereby, irrespective of the incidence of the hailstone impacting the structure of the turbomachine front portion, it has a tendency following impact to fly off tangentially to the wall of the impacted structure. Thus, even though the deflecting surface does not deploy radially as far as the level of the splitter fairing, the hailstones impacting the downstream end of said deflecting surface will not enter within the annular primary duct, but will follow the aforementioned imaginary line.

Preferably, said actuator is made of shape memory alloy so as to make it possible, once it reaches a given transition temperature causing it to adopt its memorized shape, to place said deflecting surface in the deployed position for deflecting the foreign bodies, and said deflector system additionally comprises elastic return means making it possible, when said actuator has a temperature below said given transition temperature, to return said deflecting surface into its retracted position.

In such a case, the nature of the actuator provides the deflector system with a high degree of reliability and also with a long life.

The reliability obtained can be explained in part by a high degree of confidence in the deployment/retraction of the deflecting surface that is provided by the physical properties of the material of the actuator made of shape memory alloy, which properties are directly associated with the temperature of the material.

In this regard, it should be noted that the temperature of the actuator can be modified easily by bleeding hot air from a suitable portion of the turbomachine, such as hot air from the compressor, for example.

With such a configuration, provision can be made for said actuator and said deflecting surface to be formed by one and the same element made of shape memory alloy. Alternatively, it is also possible to make provision for only the actuator to be made of shape memory alloy. In such a case, the actuator can then constitute the mechanical connection between the internal support shroud and the deflecting surface, this surface being made from a conventional material other than that of the shape memory alloy type.

Preferably, said element made of shape memory alloy takes the form of a deflecting strip, and said elastic return means take the form of an elastic strip coupled mechanically to and superposed on said deflecting strip.

A space for admitting hot air can be provided between said elastic strip and said deflecting strip in order to allow a good distribution of the hot air along the whole length of the deflecting strip made of shape memory alloy.

Preferably, the deflector system includes a hot air inlet communicating with said space for admitting hot air, this hot air inlet taking the form of a hollow stud.

Preferably, the turbomachine front portion is equipped with a plurality of foreign body deflector systems spaced angularly from one another about a longitudinal axis of the turbomachine.

Each foreign body deflector system is preferably installed on said internal support shroud for the fan outlet guide vanes by stamping the hollow stud which forms the hot air inlet of the deflector system and which passes through this internal shroud.

Preferably too, said hot air inlet of each foreign body deflector system passes through said internal support shroud for the fan outlet guide vanes, and said turbomachine front portion comprises a hot air distributor situated opposite to and radially inwardly with respect to each deflector system.

As mentioned above, said hot air distributor is preferably supplied with hot air using air from a compressor of the turbomachine.

Preferably, said distributor has a plurality of outlets spaced angularly from one another about said longitudinal axis of the turbomachine, each outlet being opposite one hot air inlet of a foreign body deflector system, respectively. Thus, that advantageously makes it possible to have a single distributor to supply all the deflector systems.

Preferably, in the deployed position for deflecting the foreign bodies, said deflecting surface takes the form, in longitudinal section, of a curved line which opens in the upstream direction and radially toward the outside of the turbomachine, this form being perfectly suited to ensuring that foreign bodies such as hailstones are diverted in a satisfactory manner.

For reasons of aerodynamic continuity, in the retracted position, said downstream end of the deflecting surface is preferably flush with the outer surface of said internal support shroud for the fan outlet guide vanes.

Another subject of the invention is a turbomachine comprising a front portion as described above.

A further subject of the invention is a deflector system for a turbomachine, intended to prevent/limit the ingress of foreign bodies such as hailstones inside a primary duct of the turbomachine, said deflector system comprising at least one deflecting surface together with an actuator for moving said deflecting surface from a retracted position to a deployed position for deflecting the foreign bodies. According to the invention, said actuator is made of shape memory alloy so as to make it possible, once it reaches a given transition temperature causing it to adopt its memorized shape, to place said deflecting surface in the deployed position for deflecting the foreign bodies, and said deflector system additionally comprises elastic return means making it possible, when said actuator has a temperature below said given transition temperature, to return said deflecting surface into its retracted position.

Other advantages and features of the invention will become apparent from the nonlimiting detailed description below.

BRIEF DESCRIPTION OF THE DRAWINGS

This description will be given with reference to the appended drawings, in which.

DETAILED DESCRIPTION OF PREFERRED EMBODIMENTS

Figure 1:
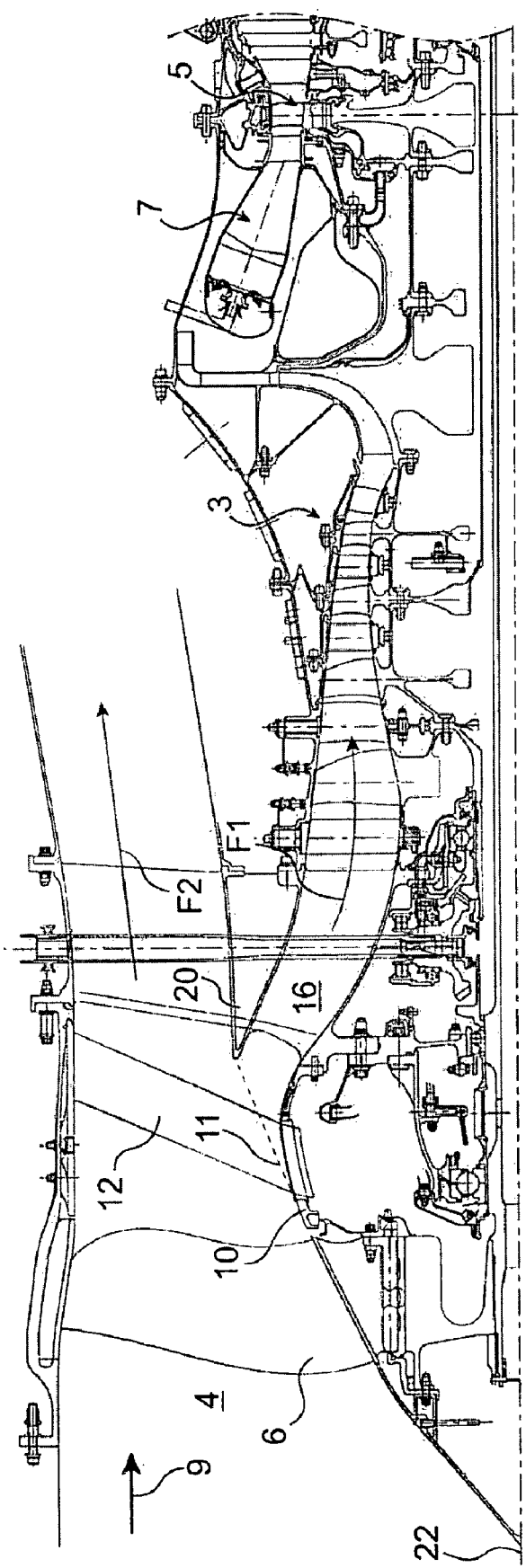
FIG. 1, already described in part, represents a turbomachine front portion according to one embodiment of the invention.
Figure 2:
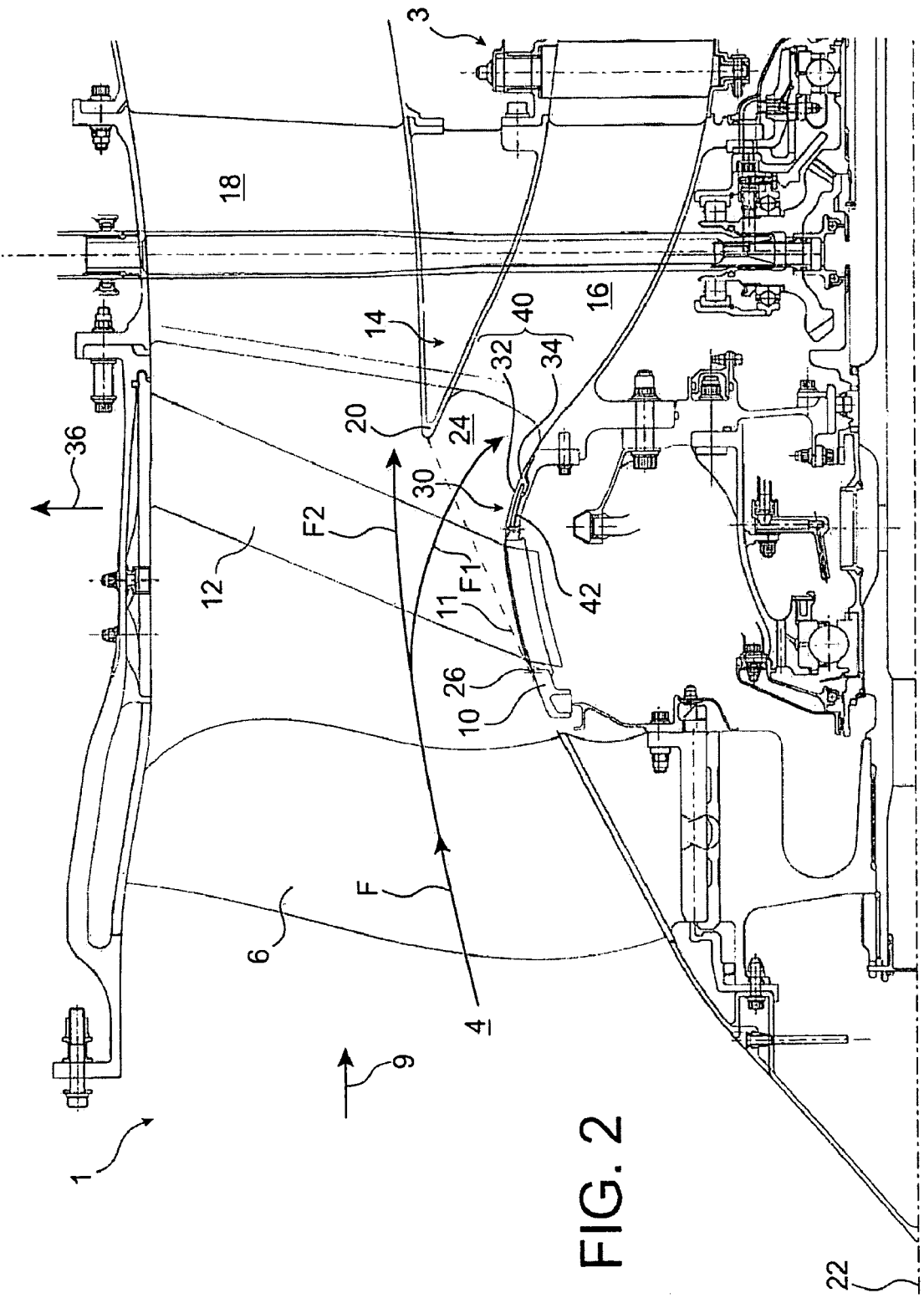
FIG. 2 represents a half-view in longitudinal section of a turbomachine front portion according to a preferred embodiment of the present invention, the foreign body deflector system being shown in its retracted position.

With reference first of all to FIG. 2, there can be seen a turbomachine front portion 1 for an aircraft, of the small-size type devoid of a low-pressure compressor. This turbomachine 1 is presented in the form of a preferred embodiment of the present invention and has an overall similar design to that shown in FIG. 1, namely comprising a single HP compressor 3 and a single HP turbine 5, between which is situated a combustion chamber 7. In this regard, in the figures, the elements bearing the same numerical references correspond to identical or similar elements.

More specifically with regard to the front portion 1, it comprises, in a general direction of fluid flow through this turbomachine, starting from upstream to downstream as is represented schematically by the arrow 9, an air inlet 4, a fan 6, an internal support shroud 10 for the fan outlet guide vanes 12, and a flow splitter fairing 14 from which there originate an annular primary duct 16 and an annular secondary duct 18 arranged radially outwardly with respect to the primary duct 16. Of course, these conventional elements known to a person skilled in the art each have an annular shape which is centered on a longitudinal axis 22 of the turbomachine.

Thus, the air flow F passing through the fan 6 and through the fan outlet guide vanes 12 is divided into two separate flows after it comes into contact with the upstream end 20 of the splitter fairing 14, namely into a primary flow F1 entering the duct 16 and a secondary flow F2 entering the duct 18.

In order to limit the introduction of foreign bodies such as hailstones into the primary duct 16, the splitter fairing 20 is placed in such a way that the inlet 24 of the primary duct is substantially "masked" by the outer surface of the internal support shroud 10, as shown by the broken imaginary line 11 in FIG. 2. Nevertheless, the adopted degree of setback can be less than that encountered previously and discussed with reference to FIG. 1, showing one embodiment of the prior art, with the aim of providing better air supply to the annular primary duct 16.

The masked nature of the inlet 24 stems from the fact that a hailstone impacting the internal support shroud 10 will have a tendency to fly off substantially tangentially to the outer surface of this shroud, irrespective of the path of the hailstone prior to impact. Therefore, any hailstone impacting the internal support shroud 10 before the point 26 from which there originates the aforementioned imaginary line 11, corresponding to a tangential direction of the section of the shroud at this point, will be diverted by this shroud in a manner such that it will not enter the primary duct 16, but will pass radially outwardly with respect to the inlet 24 of this duct 16.

To limit even further the introduction of foreign bodies such as hailstones into the primary duct 16, one of the particular features of the present invention lies in the installation of a plurality of deflector systems 30 on the internal support shroud 10 for the guide vanes 12.

Figure 3:
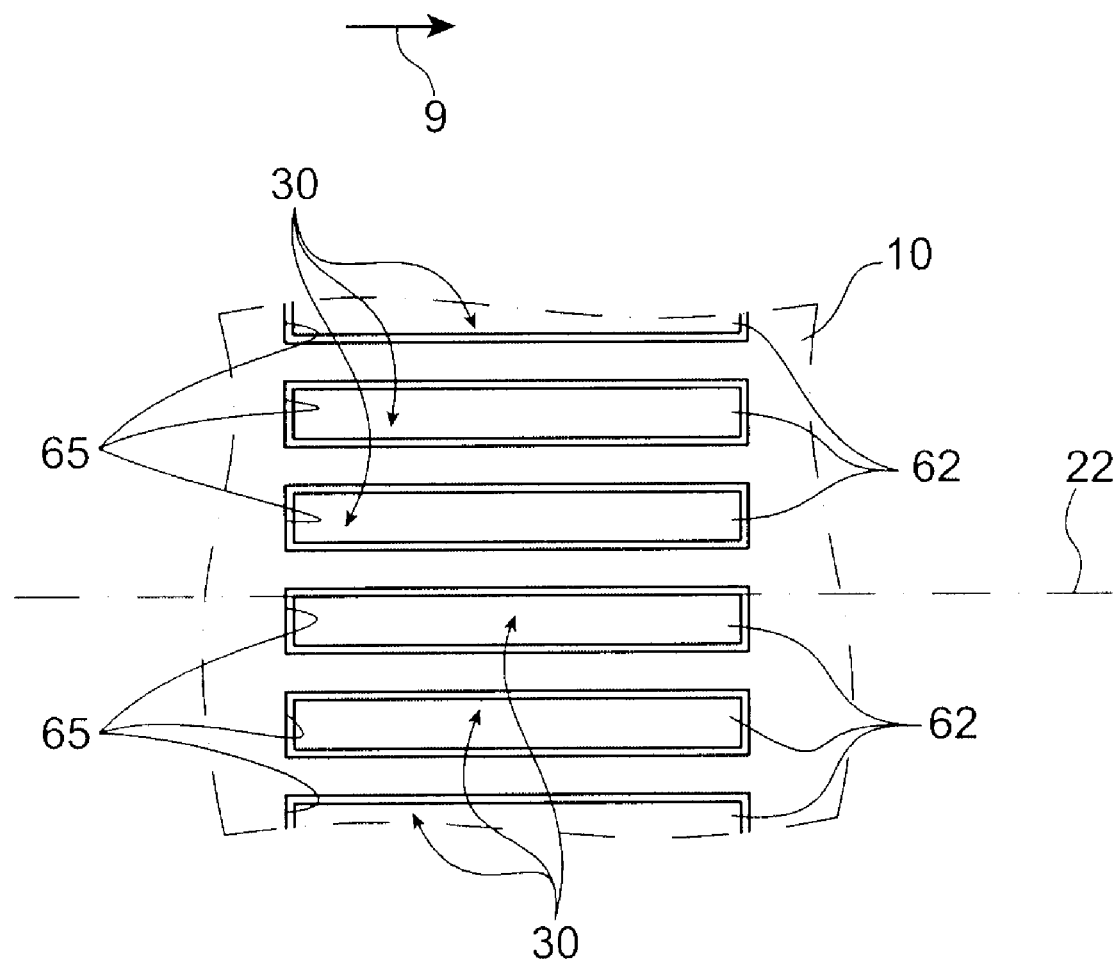
FIG. 3 represents a partial plan view of the turbomachine front portion shown in FIG. 2.

The deflector systems 30 are spaced angularly from one another about the longitudinal axis 22, as is shown schematically in FIG. 3. Preferably, they are substantially close to one another so that jointly they substantially form a deflector ring around the internal support shroud 10. When the deflecting surfaces are in the deployed position as will be described below, free spaces remain between the directly consecutive deflecting surfaces in the angular/circumferential direction, thereby making it possible in particular to continue to allow air to pass in the direction of the primary duct 16.

With reference once more to FIG. 2 in which one of the deflector systems 30 can be seen, this system comprises a deflecting surface 32 together with an actuator 34 for moving the deflecting surface from a retracted position, represented in this figure, to a deployed position for deflecting foreign bodies such as hailstones. In this preferred embodiment, the actuator 34 and the deflecting surface 32 are formed by one and the same element made of shape memory alloy, as will be described in detail below.

The deflector system 30 is situated wholly upstream of the upstream end 20 of the splitter fairing 14, hence upstream of the inlet 24 of the primary duct 16, while remaining close to this inlet. Furthermore, it is arranged on the internal support shroud 10 downstream of the fan outlet guide vanes 12, thus being placed substantially at the widest portion of the shroud 10 in the radial direction depicted by the arrow 36, as is shown in FIG. 2.

Figure 4:
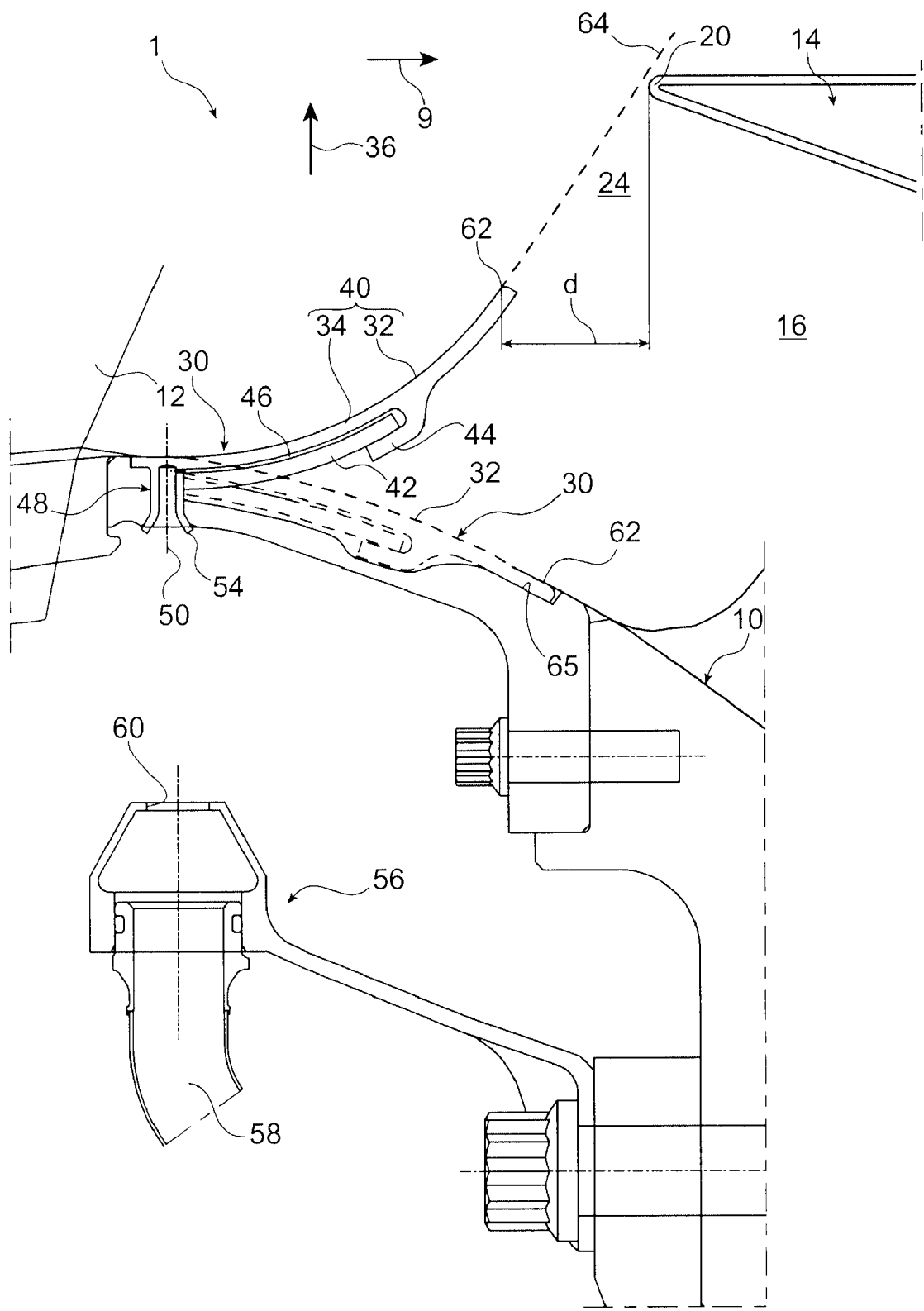
FIG. 4 represents an enlarged partial view of the view shown in FIG. 2, with the foreign body deflector system represented, on the one hand, in its retracted position and, on the other hand, in its deployed position for deflecting the foreign bodies.

Preferably, the actuator 34 and the deflecting surface 32 are jointly formed from a single deflecting strip 40 made of the shape memory alloy, so as to make it possible, once this strip reaches a given transition temperature causing it to adopt its memorized shape, to place the deflecting surface 32 in the deployed position, shown in FIG. 4, for deflecting foreign bodies such as hailstones. Moreover, the deflector system 30 comprises elastic return means which take the form of an elastic strip 42 coupled mechanically to and superposed on the deflecting strip 40. This elastic strip makes it possible, when the strip 40 has a temperature below the given transition temperature, to return the deflecting surface 32 into its retracted position.

More precisely, the two strips 40, 42 forming a bi-strip system extend substantially in the direction of the longitudinal axis of the turbomachine, and they each roughly take the form of a rectangle, although any other form deemed appropriate by a person skilled in the art could be adopted, without departing from the scope of the invention.

In the preferred embodiment, the deflecting strip 40 has, radially inwardly, a hook 44 into which a downstream end of the elastic strip 42 is inserted. This mechanical coupling enables them to be maintained substantially parallel to one another, a space 46 for admitting hot air nevertheless being provided between the two strips 40, 42.

At an upstream end of these two strips 40, 42, the deflector system 30 has a hollow stud 48 forming a radially inwardly open hot air inlet 50 and communicating with the inter-strip space 46 for admitting hot air. Furthermore, the upstream ends of these two strips 40, 42 are each secured to the hollow stud 48, as is shown in FIG. 4.

In this regard, it should be noted that the deflector system 30 is preferably installed on the internal support shroud 10 by stamping the hollow stud 48 which passes through this internal shroud 10, its lower radial end 54, which is deformed by stamping, thus holding the entire system 30 mechanically in place.

In order to supply the deflector system 30 with hot air, there is provided a hot air distributor 56 which is situated opposite the hot air inlet 50 formed by the hollow stud 48 and which is arranged radially inwardly with respect to the latter inlet. Preferably, this distributor 56 is supplied with hot air via an air line 58 connected to the compressor 3 of the turbomachine. Furthermore, provision is preferably made for the distributor 56 to have a plurality of outlets 60 spaced angularly from one another about the longitudinal axis of the turbomachine, each outlet 60 then being situated opposite one of the hot air inlets 50, as shown in FIG. 4. Therefore, the distributor 56, centered on the longitudinal axis of the turbomachine, has as many outlets 60 as there are deflector systems 30 provided.

The system 30 for deflecting hailstones and other foreign bodies is able to operate in the following manner.

First of all, with the system in the rest situation, the return force delivered by the elastic strip 42 causes the deflecting strip 40 to be pressed against the internal support shroud 10, as is shown by the broken lines in FIG. 4. The deflecting surface 32 thus adopts a retracted position in which it has perfect aerodynamic continuity with the outer surface of the internal support shroud 10, so as to have the least possible disturbance on the air entering the primary duct 16. In particular, each downstream end and upstream end 62 of the deflecting surface 32 is flush with the outer surface of the internal support shroud 10. To make this possible, the shroud 10 has a receptacle 65 in which the bi-strip system 40, 42 is housed.

When it is necessary to divert the hailstones in order to limit their entry into the primary duct 16, a situation which may cause a flameout in the combustion chamber 7, a suitable control makes it possible to generate a signal which leads to hot air being bled from the compressor 3, this hot air then being conveyed to the distributor 56 through the line 58. The hot air is then directed toward the outlets 60 and then enters the associated inlets 50 formed by the hollow studs 48. The hot air present in each stud 48 is then directed toward the inter-strip space 46, from which it can heat the deflecting strip 40 made of shape memory alloy. Under the effect of the heat received, the strip 40 on reaching its transition temperature is deformed rapidly to adopt its memorized shape, in which the deflecting surface 32 is placed in its deployed position for deflecting the hailstones, as is shown by a solid line in FIG. 4. Of course, the observed deformation of the deflecting strip 40 occurs while counteracting the return force generated by the elastic strip 42, the latter following the movement of the strip 40 on account of their mechanical connection provided by the hook 44.

When the deflecting surface 32 reaches its deployed position, its downstream end 62 is situated upstream of the upstream end 20 of the flow splitter fairing 14, as is evidenced by the longitudinal distance, referenced "d" in FIG. 4, between these two elements.

More specifically, in any longitudinal section such as that shown in FIG. 4, the imaginary straight line 64, corresponding to a tangential direction of the downstream end 62, passes upstream of the upstream end 20 of the splitter fairing 14, but preferably in close proximity to this end 20.

Thus, the hailstones impacting the downstream end 62 of the deflecting surface 32, or any other part of this surface 32, will have a tendency to fly off along the imaginary straight line 64, and will advantageously thus not enter within the annular primary duct 16. This derives from the fact that a hailstone has a tendency, following the impact, to fly off tangentially to the wall of the impacted structure, and also from the fact that the deflecting surface 32 takes the form, in longitudinal section, of a curved line which opens in the upstream direction and radially toward the outside of the turbomachine. The latter specific characteristic implies in particular that, irrespective of the point of impact of a hailstone on the deflecting surface 32, it will have a tendency to follow the surface 32 right to its downstream end 62, from which it will then be ejected in the direction of the imaginary straight line 64, enabling it to pass radially outwardly with respect to the inlet 24 of the annular primary duct 16.

When hailstone diversion is no longer desired, all that is then required is to interrupt the hot air supply, which results in the deflecting strip 40 having a temperature below its transition temperature, allowing the elastic strip 42 to return the deflecting strip 32 into its rest position in which it is placed against the internal support shroud 10 for the guide vanes 12.

Of course, various modifications may be made by a person skilled in the art to the invention which has just been described, purely by way of nonlimiting examples.

The invention claimed is:

1. A turbomachine front portion comprising an internal support shroud for fan outlet guide vanes of a fan, and a flow splitter fairing from which an annular primary duct and an annular secondary duct of the turbomachine originate, wherein said front portion additionally comprises at least one deflector system configured to prevent or limit the ingress of foreign bodies inside said primary duct of the turbomachine, said deflector system comprising a plurality of movable deflecting surfaces together with an actuator configured to move said deflecting surfaces from a retracted position to a deployed position for deflecting the foreign bodies and to move said deflecting surfaces from said deployed position back to said retracted position, said deflector system being mounted on said internal support shroud such that, in the deployed position, a downstream end of each deflecting surfaces is situated upstream of said flow splitter fairing,
   wherein said deflecting surfaces are spaced angularly from one another about a longitudinal axis of the fan such that free spaces remain between directly consecutive deflecting surfaces in said deployed position so as to allow air to pass through said deflecting surfaces and into said annular primary duct.

2. The turbomachine front portion as claimed in claim 1, wherein said deflector system is mounted downstream of said fan outlet guide vanes.

3. The turbomachine front portion as claimed in claim 1, wherein, in any longitudinal section passing through said deflector system, an imaginary straight line corresponding to a tangential direction of said downstream end of said deflecting surface, in the deployed position, passes upstream of an upstream end of said splitter fairing.

4. The turbomachine front portion as claimed in claim 1, wherein said actuator includes an element made of shape memory alloy so that after said actuator reaches a given transition temperature said actuator adopts its memorized shape and said deflecting surfaces move into said deployed position for deflecting the foreign bodies, and wherein said deflector system additionally comprises elastic return means for returning said deflecting surfaces into said retracted position after said actuator has a temperature below said given transition temperature.

5. A turbomachine front portion comprising an internal support shroud for fan outlet guide vanes of a fan, and a flow splitter fairing from which an annular primary duct and an annular secondary duct of the turbomachine originate, wherein said front portion additionally comprises at least one deflector system configured to prevent or limit the ingress of foreign bodies inside said primary duct of the turbomachine, said deflector system comprising at least one movable deflecting surface together with an actuator configured to move said deflecting surface from a retracted position to a deployed position for deflecting the foreign bodies and to move said deflecting surface from said deployed position back to said retracted position, said deflector system being mounted on said internal support shroud such that, in the deployed position, a downstream end of each deflecting surface is situated upstream of said flow splitter fairing, wherein said actuator and said deflecting surface are formed by one and the same element made of shape memory alloy, said turbomachine front portion comprising a plurality of foreign body deflector systems spaced angularly from one another about a longitudinal axis of the turbomachine.

6. The turbomachine front portion as claimed in claim 5, wherein said actuator includes an element made of shape memory alloy, wherein said element made of shape memory alloy includes a deflecting strip, and wherein said element made of shape memory alloy includes a deflecting strip.

7. A turbomachine front portion comprising an internal support shroud for fan outlet guide vanes of a fan, and a flow splitter fairing from which an annular primary duct and an annular secondary duct of the turbomachine originate, wherein said front portion additionally comprises at least one deflector system configured to prevent or limit the ingress of foreign bodies inside said primary duct of the turbomachine, said deflector system comprising at least one movable deflecting surface together with an actuator configured to move said deflecting surface from a retracted position to a deployed position for deflecting the foreign bodies and to move said deflecting surface from said deployed position back to said retracted position, said deflector system being mounted on said internal support shroud such that, in the deployed position, a downstream end of each deflecting surface is situated upstream of said flow splitter fairing, wherein said deflector system comprises elastic return means for returning said deflecting surface into said retracted position, and wherein said elastic return means include an elastic strip coupled mechanically to and superposed on a deflecting strip, said turbomachine front portion comprising a plurality of foreign body deflector systems spaced angularly from one another about a longitudinal axis of the turbomachine.

8. The turbomachine front portion as claimed in claim 6, wherein a space for admitting hot air is provided between said elastic strip and said deflecting strip.

9. The turbomachine front portion as claimed in claim 8, wherein said deflector system includes a hot air inlet communicating with said space for admitting hot air.

10. The turbomachine front portion as claimed in claim 9, wherein said hot air inlet takes the form of a hollow stud.

11. The turbomachine front portion as claimed in claim 10, wherein each foreign body deflector system is installed on said internal support shroud by stamping the hollow stud which forms the hot air inlet of the deflector system.

12. The turbomachine front portion as claimed in claim 11, wherein said hot air inlet of each foreign body deflector system passes through said internal support shroud for the fan outlet guide vanes, and wherein said turbomachine front portion comprises a hot air distributor situated opposite to and radially inwardly with respect to each deflector system.

13. The turbomachine front portion as claimed in claim 12, wherein said hot air distributor is supplied with hot air using air from a compressor of the turbomachine.

14. The turbomachine front portion as claimed in claim 12, wherein said distributor has a plurality of outlets spaced angularly from one another about said longitudinal axis of the turbomachine, each outlet being opposite one hot air inlet of a foreign body deflector system, respectively.

15. The turbomachine front portion as claimed in claim 1, wherein, in the deployed position for deflecting the foreign bodies, said deflecting surface takes the form, in longitudinal section, of a curved line which opens in the upstream direction and radially toward the outside of the turbomachine.

16. The turbomachine front portion as claimed in claim 1, wherein, in the retracted position, said downstream end of the deflecting surface is flush with the outer surface of said internal support shroud for the fan outlet guide vanes.

17. A turbomachine comprising a front portion as claimed in claim 1.

18. A deflector system mounted on an internal support shroud of fan outlet guide vanes of a turbomachine front portion, the deflector system situated upstream from a flow splitter fairing from which an annular primary duct and an annular secondary duct of the turbomachine originate, said deflector system comprising at least one movable deflecting surface together with an actuator configured to move said deflecting surface from a retracted position to a deployed position, wherein said actuator is made of shape memory alloy such that when said actuator reaches a given transition temperature, said shape memory alloy adopts its memorized shape and said deflecting surface moves in the deployed position, and wherein said deflector system additionally comprises elastic return for returning said deflecting surface into said retracted position after said actuator has a temperature below said given transition temperature, where said elastic return means include an elastic strip coupled mechanically to and superposed on a deflecting strip, and wherein in the deployed position, said deflecting surface takes the form, in longitudinal section, of a curved line which opens in the upstream direction and radially toward the outside of the turbomachine.

* * * * *